Jan. 30, 1968  G. BONNET  3,366,782
AUTOMATIC CALCULATION OF CORRELATION FUNCTIONS
Filed July 29, 1963  3 Sheets-Sheet 1
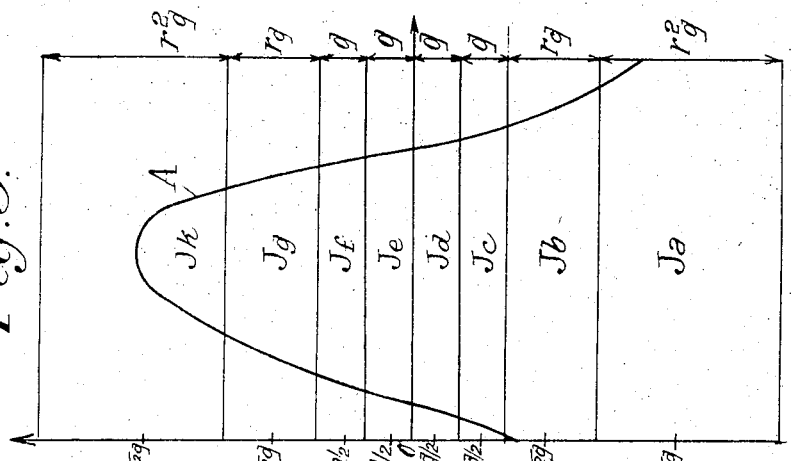
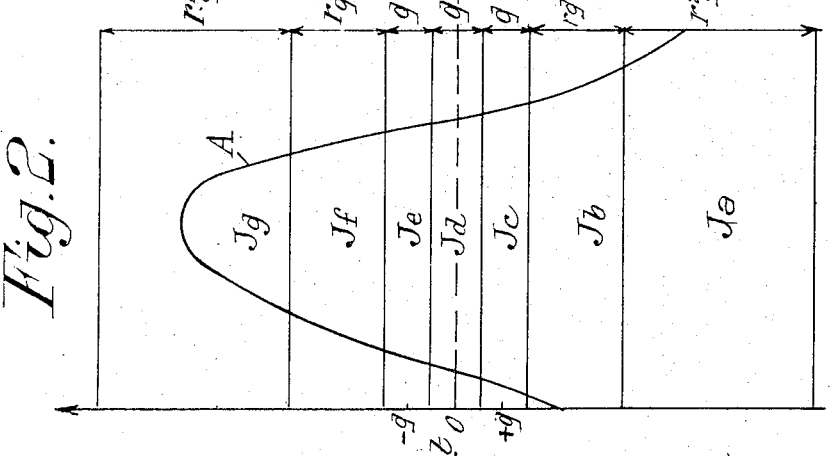
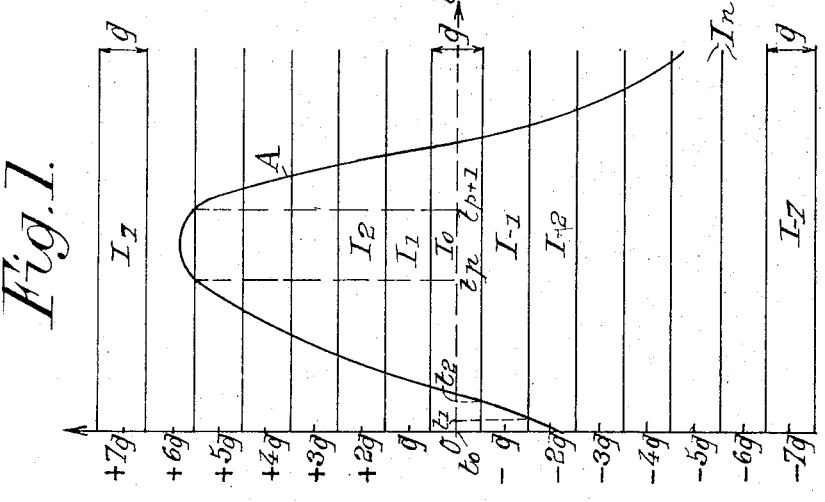

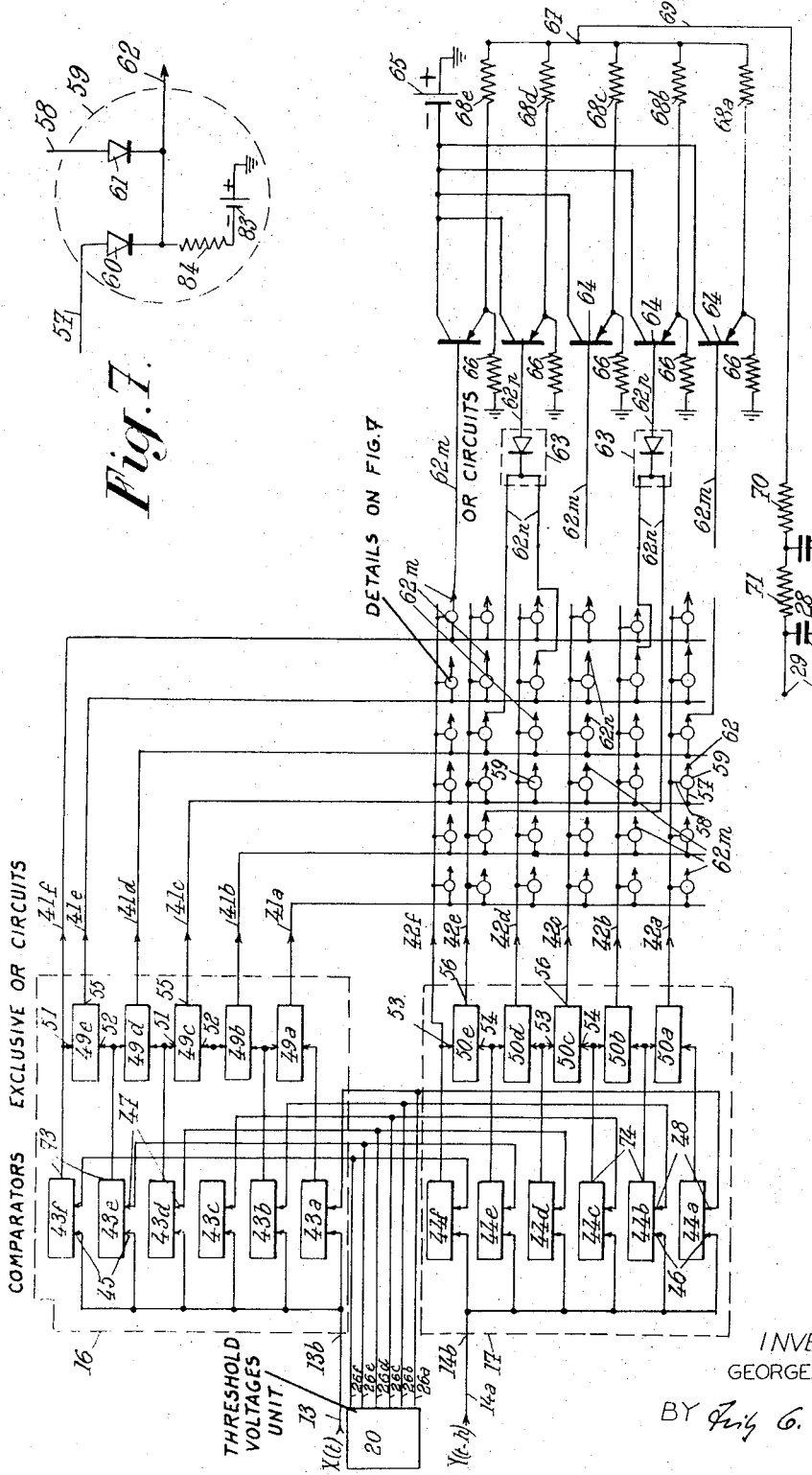

3,366,782
AUTOMATIC CALCULATION OF CORRELATION FUNCTIONS

Georges Bonnet, Grenoble, France, assignor to Commissariat à l'Energie Atomique, Paris, France, a society of France
Filed July 29, 1963, Ser. No. 298,378
Claims priority, application France, July 30, 1962, 905,451
2 Claims. (Cl. 235—181)

The present invention relates to devices for the automatic calculation of correlation functions and in particular to devices for treating two electrical signals the variations of amplitude of which as a function of time represent either two functions the cross-correlation function of which is to be calculated or a single function with a time lag, when it is desired to determine the auto-correlation function.

It should be reminded that $X(t)$ and $Y(t)$ being two random functions of an independent variable $t$ (which may be time for instance) representing two electrical signals:

the cross-correlation function $C_i(h)$ is the expectation of the product $X(t).Y(t-h)$ that is to say $$C_i(h) = E[X(t).Y(t-h)]$$

and the auto-correlation function $C_a(h)$ is the expectation of the product $X(t).Y(t-h)$ that is to say $$C_a(h) = E[X(t).X(t-h)]$$

E being the symbol representing the expectation and $h$ representing a time lag which may be zero in the case of a cross-correlation function.

It is also possible to express these two correlation functions by the limits, when T tends toward infinity, of the following terms $$\frac{1}{2T}\int_{-T}^{+T} X(t)\cdot Y(t-h)dt, \text{ for } C_i(h)$$

$$\frac{1}{2T}\int_{-T}^{+T} X(t)\cdot X(t-h)dt, \text{ for } C_a(h)$$

(hypothesis of ergodicity).

The interest of correlation functions is first due to the fact that they permit of discovering hidden dependencies between some physical or biological phenomenons, which makes the methods and devices for calculating these functions very useful in pure and applied research, in particular in the field of measurement.

Use is also made of the cross-correlation function between the input signals and the output signals of an electric or electronic system for determining the pulse response of the system.

Finally, among other applications of the calculation of correlation functions, there is also their use for the directional detection of the useful (electro-magnetic or electro-acoustic) signals and their use in general in communication or automatic control systems, which use is based upon the fundamental property of correlation functions which permits of passing from the field or domain of a real variable (such as time) to the field or domain of an imaginary variable (such as frequency or angular frequency), to wit the fact that, under some conditions, the auto-correlation functions and the density functions of the energetic spectrum (therefore of the spectrum of frequencies or angular frequencies) are Fourier transforms from one another multiplied by a constant factor.

When it is desired automatically to calculate correlation functions very quickly, it is very difficult, if not impossible, instantaneously to effect the analog multiplication of the two factors under the symbol of expectation or integration, then the analog integration of the successive products, in particular in the case where signals of high frequency are treated.

This is why two methods have been suggested for the quick approximate calculation of correlation functions, to wit: the polarity coincidence method according to which the crests of the signals are cut off and account is taken only of the sign (or polarity) of the signals without taking their amplitude into account; this is a very rough method for determining correlation functions, which does not permit an accurate calculation and which leads to important errors in directional detection problems: the quantization method, which preserves the order of magnitude of the signals in addition to their sign (or polarity); this method is not so rough as that above mentioned and permits quicker determinations than the accurate analog calculation method; however in many cases its accuracy and its rapidity are not sufficient.

This is why the present invention has more especially for its object improvements in devices for the automatic calculation of correlation functions, making use of the analog random function or signal quantization method.

The chief object of the present invention is to provide devices for the automatic calculation of correlation functions making use of the quantization method which comply better than up to this time with the various requirements of practice, in particular concerning the limitation of the number of quantization intervals for a given accuracy, the possibility of processing signals having greater variations, and the quickness and facility of calculation.

The essential feature of the present invention consists in effecting quantization not in bands or intervals of constant and equal widths, as was done up to this time, but in bands the respective widths of which increase, preferably according to a geometrical progression, in accordance with the absolute values of the signals to be processed, at least for signals the absolute values of which are above a given limit.

Preferably, use is made of at least one or several of the following of the secondary characteristics:

(a) The discrete values, which are substituted for the analog values of the signals, are substantially equal, for each of the bands of increasing width, to the geometrical mean of the values of the limits of the band;

(b) The limit between two successive particular bands is equal to the mean value of the signals to be treated, in particular is equal to zero in the case of centered signals (having a mean value equal to zero); in other words use is made of a noncentered quantization (it is reminded that the centering of quantization is not to be confused with that of the signals or random variables).

Preferred embodiments of the present invention will be hereinafter described with reference to the appended drawings, given merely by way of example, and in which:

FIG. 1 illustrates the known method of quantization with bands of constant and equal widths;

FIGS. 2 and 3 illustrate the application of the invention with bands of increasing widths (at least above a given amplitude of the signal) respectively in the case of a centered quantization and in the case of a noncentered quantization;

FIG. 6 illustrates in a more detailed fashion a portion of the device of FIG. 5, to wit the quantization, multiplication and integration units;

FIG. 7 shows the mounting of each of the nodes of the matrix of the multiplication unit illustrated by FIG. 6.

Figure 4:
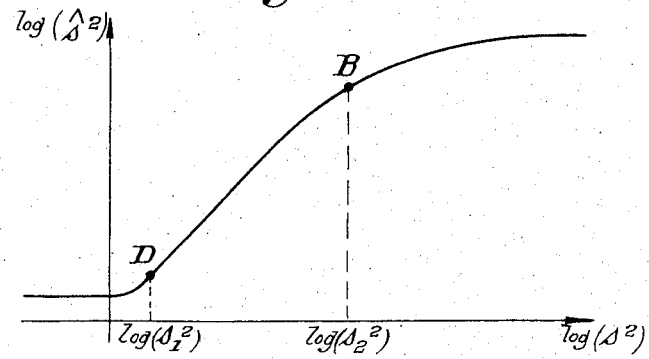
FIG. 4 shows, in logarithmic coordinates, the curve indicating the variation of the variance of a quantized signal as a function of the variance of the original signal (before quantization)

Referring first to FIG. 1 the characteristics of correlation by the quantization method which must be known to understand the invention will first be stated.

Let $X(t)$ be a stationary random function (that is to say a function the statistical properties of which do not vary for any translatory displacement of the axis of times $t$ along itself), this function being centered (that is to say having a mean value or an expectation equal to zero). If the whole of the possible values of $X(t)$ is divided into an infinite set of successive bands or intervals $I_n$ of a width equal to $q$ surrounding the points of ordinates $x=nq$ ($n$ being an algebraic integer ranging from $-\infty$ to $+\infty$), the operation of "infinite periodical quantization" consists in substituting for the random variable X the discrete variable $\hat{X}=nq$ when X is in the band $I_n$. A study of the statistical mean values of the quantized random variable $\hat{X}$ (made in particular by W. R. Bennet in the "Bell System Technical Journal," 27 (1948), pages 446–472 and by B. Widrow in "The Transactions of the Institute of Radio Engineers" CT–3, 4 (1956), pages 266–276) shows that the mean values of the second order —variances $\hat{s}^2$ and correlation function $\hat{C}(h)$—of the signal thus quantized differ very little from the corresponding means values—variance $s^2$ and correlation function $C(h)$ (which is a function of the single variable $h$ in the case of a stationary random function) from the origin signal i.e. the signal before quantization) if the ratio $s/q$ is greater than 1. As a matter of fact $$\hat{s}^2 = s^2\left(1 + \frac{1}{12}\cdot\frac{q^2}{s^2}\right)$$

$$\hat{C}(h) = (1+a).C(h) + DC(h)$$

the corrective terms $a$ and $DC(h)$ being of the order of magnitude of $$e^{-\frac{2s^2}{q^2}}$$

It will therefore be seen that the ratio $v=s/q$ constitutes a quality factor for a quantization, which is the better as $v$ is greater.

On the other hand, the probability theory shows that the variation of a random signal about its mean or central value (which is zero in the case of a signal represented by a centered random function) is practically limited to $u.s$, $u$ being a small number (thus 99% of the values of $X(t)$ differ by less than 2.326 $s$ from the central value in the case of a normal distribution, also called Gauss-Laplace distribution). Advantage may be taken from this statistic law to limit the number of bands $I_n$ that are used and to perform a "limited periodical quantization" by bringing into play only a reduced number N of bands on either side of the axis of abscissas, the total width of which is substantially equal to $u.s$ ($u$ being for instance equal to a number ranging from 3 to 6).

In this case (FIG. 1) the exact value of $X(t)$ represented by curve A is replaced by $-2q$ for $t_0 \leqslant t < t_1$, by $-q$ for $t_1 \leqslant t < t_2$ ..., by $6q$ for $t_p \leqslant t < t_{p+1}$ ..., the exceptional values above band $I_7$ or below band $L_{-7}$ being eliminated or considered as belonging to bands $I_7$ or $L_{-7}$.

The results obtained when calculating the correlation functions by the limited periodical quantization method bringing into play in the known manner N bands (on either side of the axis of abscissas) of width equal to $q$, always the same whatever be the signals that are being processed and constant (case of FIG. 1), depend upon ratio $v$ and upon N. If the signals that are processed are not stationary and if the root means square deviation varies within wide limits, the kinds of difficulties are met with when applying this known method:

(1) for signals having a high root mean square deviation $s$ ($s > N.q$), the probability of their presence in the central bands becomes small and the method tends toward the polarity coincidence method, with all the drawbacks inherent in this last method.

(2) for signals having a very small root mean square deviation $s$ ($s \leqslant q$), the signal will practically always have a value within the band corresponding to the central value ($I_0$ for the centered signals) and the output of the calculation device will remain nearly always constant (zero for centered signals) so that it is impossible to make use of this method in the case of centered quantization and of small signals.

The improvements according to the present invention permit of obviating the above cited drawbacks. As a matter of fact, as illustrated by FIGS. 2 and 3, where curve A has been reproduced, use is made according to the invention no longer of quantization bands of uniform width but of bands the widths of which increase, preferably in accordance with a geometrical progression, with the absolute values of the signal to be processed possibly with the exception of the first bands (or central bands) the width of which may be identical to one another.

Thus the bands according to the present invention, to wit $Ja$, $Jb$, $Jc$, $Jd$, $Je$, $Jf$, $Jg$, $Jh$, are in a reduced number and the widths of said bands increase according to a geometrical progression of ratio $r$ the central band or bands being of width $q$ and the other bands then having successive widths $rq$, $r^2q$, ... In particular, in the case of a geometrical progression of ratio $r$, and of a centered quantization, it is possible to have (on either side of the axis of abscissas) a number of central bands of constant width close to $$\frac{r}{r-1}$$

The discrete values which are substituted for the analog values of the signal when it is within a band are then preferably substantially equal to the geometric mean of the values of the two limits of the band, possibly with the exception of the central bands, of identical width.

Furthermore, for reasons which will be hereinafter stated, in particular in order to extend the range of operation to signals having a low value of $s$, one of the threshold or limits of quantization has a value equal to zero. This is the case of the quantization according to FIG. 3 where the limit between bands $Jd$ and $Je$ has an ordinate equal to zero. If the signals are not centered, the same results are obtained as when one of the limits is equal to the mean value of the signals.

When using a limited quantization of the type illustrated by FIG. 3, that is to say using bands the widths of which increase according to a geometrical progression, the limit of one of the bands having a value equal to zero (or a value equal to the mean value of the signals) and the discrete value of quantization of a band being equal to the geometrical mean of the two limits of this band (the geometrical progression eventually not applying to the bands corresponding to weak signals the number of which is close to $$\frac{r}{r-1}$$

on either side of the axis of abscissas) it is found that there is obtained a quantization with a quality criterion, $v=s/q$, constant for a whole set of values of variance $s^2$.

Reference is made, concerning this point, to FIG. 4, in logarithmic coordinates, where the abscissas represent the variance $s^2$ of the initial (i.e. not quantized) signal and the ordinates represent the variance $\hat{s}^2$ of the quantized signal when the improvements according to the invention are applied, in particular according to FIG. 3. It will be noted that the curve $(\hat{s}^2)=f[\log(s^2)]$ comprises three portions, one of which DB, of substantially rectilinear shape, corresponds to the range of values of $s$ from $s_1$, corresponding to point D, to $s_2$ corresponding to point B, for which are obtained either satisfactory measurements or a correct directivity effect ( in the case where calculation of the correlation functions serves to perform directional detections). For weak signals ($s<s_1$), a correlator bringing into play said improvements behaves like a polarity coincidence correlator, but with satisfactory operation conditions. As a matter of fact it may be demonstrated (see in particular B. Picinbono in Comptes Rendus de l'Académie des Sciences 250, 12, (1960), pages 2179–2181) that a polarity coincidence correlator gives satisfactory results when the signal to noise ratio is lower than one, which condition is compiled with accordance to the invention (with a limit equal to zero between two successive bands) by adjusting the correlator so that the minimum level of the noise superimposed on the signal to be processed corresponds substantially to point A, that is to say so that $s \approx q/3$ (the width of the central band or of the first bands of the same width of the quantization is substantially equal to three times the root mean square deviation of the ground noise superimposed on the signal to be processed). As for the improvement obtained by applying the invention in the case of signals having a great variance, it will be noted first that it is advantageous to choose a value of $v$ averaging 1.5. If quantization is effected with successive band widths (on either side of the axis of $t$ which constitutes the limit between two successive bands having an upper and lower threshold respectively equal to zero) equal to $q, q, 2q, 4q, 8q \ldots$ ($r=2$) the discrete values of the quantized signal will be $$\pm 1/2q, \pm 3/2q, \pm 2\sqrt{2}q, \pm 4\sqrt{2}q, \pm 8\sqrt{2}q, \ldots$$

If the quantization is limited to $N_0$ bands on either side of the axis of $t$ (that is to say of the zero) there is obtained a linear portion DB (of the curve of FIG. 4) equivalent to that which will be obtained with a periodical quantization with bands all of the same width of the type illustrated by FIG. 1, which would include $N_1$ bands, with $N_1=2^{N_0-1}$. For instance with $N_0$ equal to five bands of respective widths increasing in accordance with a geometrical progression, the same precision will be obtained as with $N_1=16$ bands of constant width, which permits of considerably reducing the number of electronic elements carrying out the multiplication under the sign "expectation" or "integral" (which elements will be hereinafter indicated with reference to FIGS. 6 and 7). It is easy to understand that a great saving of means is ensured with the improvements according to the present invention, for a given accuracy. In the example above given and corresponding to FIG. 3, range DB corresponds to a ratio of the end powers of the signal averaging 500 for $N_0=5$ and 2000 for $N_0=6$.

Figure 5:
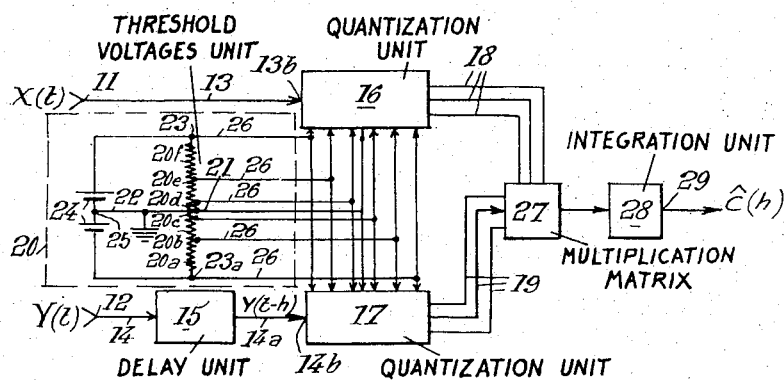
FIG. 5 shows, in the form of blocks, a device for automatically calculating correlation functions made according to the present invention.

FIGS. 5 to 7 illustrate a preferred embodiment, given by way of nonlimitative example, of a correlator, or device for automatically calculating correlation functions, made according to the present invention.

Reference will first be made to diagrammatic FIG. 5 which shows the whole of the device.

The random signals $X(t)$ and $Y(t)$—it being understood that $Y(t)$ may be either identical to $X(t)$ (calculation of an auto-correlation function) or different from $X(t)$ (calculation of a cross-correlation function)—are applied to the inputs 11 and 12 of the correlator.

This correlator comprises:

Two channels 13 and 14 connected respectively with the input terminals 11 and 12;

A delay unit 15 (constituted by a delay line) which delays by $h$ (generally adjustable) the signal $Y(t)$ travelling through channel 14 with respect to the signal $X(t)$ travelling through channel 13;

Two quantization units 16 and 17 (described hereinafter in a more detailed fashion with reference to FIG. 6) for signal $X(t)$ arriving through channel 13 and signal $Y(t-h)$ arriving through channel 14a respectively, these units delivering to the conductor systems 18 and 19, respectively the discrete (quantized values) $\hat{X}(t)$;

A unit 20 capable of supplying thresholds or limits of quantization, this unit 20 consisting of a series of resistors which have respective resistances increasing according to a geometric progression of ratio $r$ (for instance $r=2$) from point 21 which is grounded by means of conductor 22, with the exception perhaps of the resistors closest to point 21 which may all be equal to one another (to simplify FIG. 5, only six resistors 20a, 20b, 20c, 20d, 20e, 20f have been shown), it being understood that unit 20 comprises as many resistors as there are quantization bands, that is to say $m=2N$ resistors in the case of a non centered quantization, the value of the resistors being proportional to the width of the corresponding quantization bands: thus in the case of five bands ($N=5$), on either side of the axis of times, of respective widths equal to $q$, $q$, $2q$, $4q$, $8q$, the series comprises, on either side of point 21, five resistors having values $y, y, 2y, 4y, 8y$ ohms from 21 to 23 or 23a; the unit 20 also comprises a direct current source 24 for feeding current to the terminals 23, 23a of the series of resistors 20a to 20f, the middle point 25 of source 24 being grounded through conductor 22; owing to this arrangement, unit 20 supplies unit 16 and 17; through conductors 26 with the thresholds or limits of quantization, increasing according to a geometric progression (with the possible exception of some of them);

A multiplication unit 27 (described in detailed fashion hereinafter with reference to FIGS. 6 and 7) for performing the multiplication of the quantized value, $\hat{X}(t) \cdot \hat{Y}(t-h)$;

An integration unit 28 consisting (as described in a more detailed manner hereinafter with reference to FIG. 6) of a low pass filter, this unit 28 integrating the successive products $\hat{X}(t) \cdot \hat{Y}(t-h) \, dt$ for delivering, at its output 29, the correlation function $\hat{C}(h)$ little different from $C(h)$.

An embodiment of the quantization units 16 and 17 will now be described with reference to FIG. 6.

Every quantization unit comprises an input terminal 13b, 14b, respectively, receiving the signal to be quantized $X(t)$, $Y(t)$, respectively, a series of $m$ output terminals 41a, 41b, 41c, 41d, 41e, 41f for one and 42a, 42b, 42c, 42d, 42e, 42f for the other. It comprises:

$m$ Comparators 43a, 43b, 43c, 43d, 43e, 43f for one and 44a, 44b, 44c, 44d, 4e, 44f for the other. Each comparator—consisting for instance of a Schmitt trigger circuit (or bistable multivibrator with two cathode coupled triodes or two emitter coupled transistors)—having a first input 45, 46 connected to the input terminal 13b, 14b and a second input connected to one of the input conductors 26a to 26f: every trigger circuit is in the first state or condition as long as the potential on its first input 45, 46 (proportional to $X(t)$ or $Y(t-h)$) is lower than the potential on its second input 47, 48 (proportional to the threshold of the corresponding quantization band), but switches to its second state or condition as soon as the potential on its first input is higher than the potential of the threshold on its second input, then supplying a negative voltage at its output 73, 74; and ($m-1$) anti-coincidence circuits ("EXCLUSIVE OR" circuits) 49, 50, such a circuit receiving on its inputs 51, 52 or 53, 54 the outputs of two successive comparators 43 or 44 respectively and delivering a voltage on its output 55 or 56 connected to a conductor 41a to 41e or 42a to 42e when only one of its inputs is supplied with current.

The operation of the quantization units, for instance that of unit 16 is as follows, supposing that $X(t)$ ranges between the thresholds supplied by conductors 26e and 26f. Comparators 43a to 43e have their first input 45 at a potential higher than that applied to the second input 47. They are therefore in their second condition and thus supply, through their output 73, current to the inputs 51 and 52 of the anti-coincidence circuits 49a, 49b; 49c, 49d and only to the input 52 of the anti-coincidence circuit 49e. On the contrary, comparator 43f has its first input at a potential lower than that applied to its second input 47 and it therefore remains in its first condition, where it does not feed current, through its output 73, to the input 51 of circuit 49e. Thus circuits 49a, 49b, 49c, 49d have both of their inputs 51 and 52 fed with negative voltages and do not supply current (for they are made of anti-coincidence i.e. ("EXCLUSIVE OR" circuits) whereas circuit 49e has only one of its inputs (to wit 52) fed with current. It therefore supplies current through conductor 41e. In a general manner, as $X(t)$ increases, the bistable multivibrators or Schmitt trigger circuits 43a, 43b, 43c, 43d, 43e switch into their second condition and on every switching cause the anti-coincidence circuits 49a, 49b, 49c, 49d, 49e to supply current, successively. Finally, when trigger circuit 43f switches into its second condition, it feeds current directly to conductor 41f without any anti-coincidence circuit feeding current. Thus the feed of current to each of the output conductors 41a to 41f corresponds to a horizontal band of the system of FIG. 3. The same applies to the feed of each of the output conductors 42a to 42f.

The multiplication unit 27 will now be described with reference to FIGS. 6 to 7. It is constituted by a matrix, the $m$ columns of which consist of the output conductors 41a to 42f of the quantization unit 16 and the $m$ lines of which consist of the output conductors 42a to 42f of the quantization unit 17. To every intersection of a line and of a column there is connected, through conductors 57, 58, an "AND circuit" of the type illustrated by FIG. 7, which corresponds to each of the circles 59 of FIG. 6. Such a circuit comprises two diodes 60 and 61 disposed between a conductor 41 or 42 respectively and an output line 62 which is connected on the other hand to a source of negative voltage 83 through a resistor 84. The "AND circuit" 59 supplies current through its output 62 only when both of its inputs 57 and 58 are simultaneously fed with current.

The operation of the arrangement of FIG. 7 and therefore of matrix 27 is as follows:

The absence of signal on the output 55 or 56 of an anti-coincidence circuit 49 or 50 maintains at zero potential the corresponding conductor of column 41 or row 42. The output lines 62 to which lead one or two conductors 41, 42 at a potential equal to zero also remain at this zero potential. On the contrary, every time, a line 62, and only one, is connected, through two diodes 60, 61, to a conductor 41 and a conductor 42 both brought at a negative potential, these conductors being those which correspond to the circuit 49 and the circuit 50 which deliver current. This single line 62 is then brought to a negative potential. If it is supposed that conductors 41a to 41f on the one hand and 41a to 42f on the other hand correspond respectively to the quantized values $a, b, c, d, e, f$ equal to the particular numbers above indicated by way of example), the $m^2$ output lines 62 correspond to the $m^2$ logical products $ab, ac, \ldots, af, ba, bb, \ldots bf, ca, \ldots cf, fa, \ldots, ff$. Among these $m^2$ logical products the non diagonal or "rectangular" terms of the matrix are equal two by two due to the fact that $ab=ba$, $ac=ca$, etc. This is why the pairs of output lines 62n transmitting the same logical product are connected through "OR circuits" 63. On the contrary the output lines 62m of the first diagonal (corresponding to the square products $aa, bb, \ldots, ff$) do not supply currents in the "OR circuits." Finally there will be a smaller number (smaller than $m^2$ of lines 62m and 62p (the latter being the output lines of the "OR circuits" 63) which transmit all the possible logical products of the quantized discrete values, a line 62m or 62p, and a single one, being fed with current, to wit that corresponding to the logical products of the actual discrete value of $X(t)$ conveyed through one of the conductors 41 and of the actual discrete value of $Y(t-h)$ conveyed through one of the conductors 42. It will be noted that, in addition to the pairs of identical products such as $ab$ and $ba$, some other products may, for some particular quantizations, assume the same value (for instance $$8\sqrt{2}q \times 2\sqrt{2}q = 4\sqrt{2}q \times 4\sqrt{2}q)$$

Therefore, according to the discrete values that are chosen for quantizing, the correlator may include "OR circuits" having more than two inputs.

The amplitude multiplication matrix may be preceded or followed in some embodiments by a two rows and two columns matrix (for both polarities) ensuring multiplication of the signs or polarities of the signals.

Thus on one of the conductors 62m and 62p there is one signal (negative voltage) which represents a logical product of the quantized values. An amplitude proportional to this product is to be deduced from this signal.

For this purpose, every line 62m, 62p is connected to the base of a transistor 64 the collector of which is connected (possibly through a resistor common to the different transistors 64) to the negative terminal of a direct voltage source 65. The emitters of transistors 64 are connected in parallel, on the one hand to the ground through a resistor 66 having the same resistance for the different emitters, and on the other hand to an output terminal 67 through a resistor 68a, 68b, etc. the resistance of which is inversely proportional to the logical product to which corresponds the line 62p or 62m which is connected to the corresponding transistor.

Thus the transistors 64, which correspond to a line 62p or 62m which is not fed with current (that is to say which is at zero potential), do not transmit current to point 67. On the contrary a single transistor 64, which is associated with a line 62p or 62m fed with current (that is to say brought to a negative potential), supplies at 67 a current inversely proportional to the resistance of resistor 68 that corresponds thereto, therefore proportional to the corresponding logical product. Conductor 69 therefore delivers a current which, at every time, is proportional to the logical product $\hat{X}(t) \cdot \hat{Y}(t-h)$.

This current passes through the common resistor 70 before being integrated in a low-pass filter 28 of the Pi type comprising a resistor 71 in series and capacitors 72 in shunt. There is thus obtained, at the output 29 of this filter $$\int_0^t \hat{X}(t) \cdot \hat{Y}(t-h)dt$$

that is to say $\hat{C}(t)$.

Whereas there has been described an analog embodiment without sampling in time, of a correlator according to the invention, it should be well understood that the invention also applies to analog correlators with sampling and also to correlators of the numerical type with sampling. In this last case the correlator comprises, in combination, means for determining at different times the quantized discrete values of $X(t)$ and $Y(t-h)$ which values are conveyed through the lines, such as 41 and 42, of multiplication matrices, to wit one for the absolute values and the other for the signs (the latter having two rows, respectively, for sign + and sign —, and two volumns for sign + and sign — and two outputs for these two signs, respectively), means for producing a number of positive and negative pulses corresponding to the actual positive or negative logical product and a counter working in both directions so as to add up the positive pulses and to substract the negative pulses. Details of an analog construction are described in the French patent application Ser. No. 926,779 filed by the Commissariat à l'Energie Atomique on Mar. 4, 1963, now French Patent No. 1,362,476 patented Apr. 27, 1964, to which corresponds British Patent No. 1,001,096.

Finally it will be noted that the improvement according to the present application may be used in combination with those set forth in the patent application Ser. No. 298,291 filed on even date (July 29, 1963) by same applicants for Improvements in Methods and Devices Permitting Automatic Calculation of Correlation Functions. In this case the quantization bands will have a width proportional to the root mean square deviation of the signal that is being processed ($q$ will be proportional to $s$). For this this purpose, the series of resistors 29, instead of being fed by a source of direct current 24 as shown by FIG. 5, will be fed from a linear detection device of the type illustrated by this patent application, filed on even date with the present one, and the output at 29 will be amplified proportionally to $s^2$.

The device according to the present invention has in particular the following advantages:

It allows to calculate correlation functions with a very good approximation while using a small number of quantization bands even when dealing with non stationary signals, which simplifies the construction and operation of the correlator.

The quantization units and chiefly the multiplication units are simplified and thus the operation of the correlator is very safe.

In the case where the only purpose is the directional detection by correlation, it is possible to accept a reduction of the precision of the method by eliminating the first centered bands of identical width, which reduces the number of electronic elements without substantially modifying the dynamics of the system.

Finally a correlator according to the present invention has a very wide range of utilization.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. Device for automatically and accurately determining the correlation function between a first and a second random signal comprising
   a threshold unit delivering a reduced number $n$ of D.C. threshold voltages, the $n$ level values of which increase according to a geometric progression,
   a first and a second quantization unit, fed by said first and said second random signal respectively and both by said D.C. threshold voltages, quantizing, at successive quantization moments, respectively said first and said second signal to one of said $n$ level values around the central value of each signal, by comparison with said D.C. voltages, each quantization unit having a number $n$ of outputs, each output corresponding to one of said $n$ level values and one and only one of said outputs being fed at each quantization moment, i.e. the output corresponding to the actual level value to which is quantized the random signal fed to said unit,
   a matrix multiplication unit with a number $n$ of columns connected each to a different one among said $n$ outputs of said first quantization unit and a number $n$ of rows connected each to a different one among said $n$ outputs of said second quantization unit and with a series of outputs, each output of said multiplication unit coresponding to one of the possible values of the product of the possible quantized level values of said first random signal by the possible quantized level values of said second random signal and one and only one of said outputs of said multiplication unit being fed at each quantization moment, i.e. the output corresponding to the value of the product of the actual level values of said first and of said second random signal at said quantization moment,
   means controlled by said outputs of said multiplication unit for delivering, in response to the feeding of each of said outputs of said multiplication unit, an output signal proportional to the product corresponding to the fed output,
   and means for integrating said output signal.

2. Device according to claim 1, wherein said threshold unit consists of a number $n$ of resistors connected in series, the resistances of said resistor increasing according to a geometric progression from one end to the other of the series connection, of a D.C. constant voltage source having the two terminals thereof connected to the two ends of said series connection and one terminal grounded, and of $n$ outputs for said $n$ threshold voltages connected to the $n$ ends of said $n$ resistors far from said grounded terminal.

References Cited

UNITED STATES PATENTS

| | | | |
|---|---|---|---|
| 2,715,678 | 8/1955 | Barney. | |
| 2,940,071 | 6/1960 | Kindred | 340—347 |
| 3,104,370 | 9/1963 | Rabinow | 340—146.3 |
| 3,221,159 | 11/1965 | Cook et al. | 235—181 |
| 3,235,717 | 2/1966 | Martens | 235—164 |
| 3,221,324 | 11/1965 | Margopoulos | 340—347 |

MALCOLM A. MORRISON, *Primary Examiner.*

I. KESCHNER, J. F. RUGGIERO, *Assistant Examiners.*